United States Patent [19] [11] 4,123,593
Dörr et al. [45] Oct. 31, 1978

[54] PAPER FOR SERVING CABLE CORES

[75] Inventors: Hans W. Dörr, Wiesbaden-Biebrich; Ludwig Grosse, Taunusstein, both of Germany

[73] Assignee: Hoechst Aktiengesellschaft, Germany

[21] Appl. No.: 533,466

[22] Filed: Dec. 16, 1974

[30] Foreign Application Priority Data

Dec. 19, 1973 [DE] Fed. Rep. of Germany ....... 2363164

[51] Int. Cl.² .............................................. B32B 29/06
[52] U.S. Cl. .................................... 428/535; 427/202; 162/124; 536/98; 536/109
[58] Field of Search ........................ 428/535; 427/202; 260/226, 231 CM

[56] References Cited

U.S. PATENT DOCUMENTS

| 2,554,454 | 5/1951 | Casebolt | 428/535 X |
| 3,269,855 | 8/1966 | Moes et al. | 428/535 |
| 3,823,057 | 7/1974 | Roberts et al. | 428/535 X |

FOREIGN PATENT DOCUMENTS 2,152,576 4/1973 Fed. Rep. of Germany.
1,024,881 4/1966 United Kingdom ..................... 428/535

Primary Examiner—P. C. Ives
Attorney, Agent, or Firm—James E. Bryan

[57] ABSTRACT

This invention relates to a paper for serving cable cores for the purpose of providing a swellable layer, comprising a paper base having a layer thereon of cellulose ether granules or of starch phosphate granules or of a mixture of both kinds of granules. The invention also relates to a process for the production of the paper.

1 Claim, No Drawings

PAPER FOR SERVING CABLE CORES

This invention relates to paper prepared in a novel manner for use in the production of cables which are water-tight in the longitudinal direction, and to processes for the manufacture of the paper.

In the manufacture of cables having a core composed of several conductors and which are surrounded by a jacket, it is known to provide means which, in the case of a break of the cable jacket and subsequent penetration of water through the crack into the cable, prevent the water from further advancing in the interior of the cable in the longitudinal direction thereof. For this purpose, it is known to incorporate in the interior of the cable pulverulent, granular or spongy materials at a certain distance from one another, which swell when acted upon by water and thus form a stopper preventing the water from further advancing. Cellulose ethers have been suggested, inter alia, as swellable materials. The performance of the process, however, is cumbersome because it is difficult to incorporate the swellable materials in such a manner that they fill, at their location, the free space between the individual conductors and between the cable core and the cable jacket in the required density, and remain at the location determined for them during transport and laying of the cable. Simpler is a process in which a swellable or moisture-accumulating layer of paper tapes, applied without gaps by spinning, is arranged around the cable core (German Auslegeschrift No. 1,665,589), e.g. of crepe paper. Sealing in the longitudinal direction achieved thereby, however, is not satisfactory because it prevents moisture from further advancing in the cable only in an imperfect manner.

An object of the present invention is to provide a paper more suitable for serving cable cores for the purpose of arranging a swellable layer than the papers hitherto used for the same purpose. The paper of the invention has an outer or inner layer of cellulose ether granules, preferably of sodium carboxymethyl cellulose granules, or of starch phosphate granules.

Another object of the invention is to provide a process for the manufacture of the paper according to the invention. In one process in accordance with the invention, a paper web is coated with an aqueous solution of a highly viscous cellulose ether, preferably of sodium carboxymethyl cellulose (Na-CMC), and granules of a cellulose ether, preferably of Na-CMC, or of starch phosphate, or of a mixture of both types of granules are strewed onto the still wet layer and dried.

In another similar process of the invention, a wet paper web is produced on a paper machine, a layer of cellulose ether granules, preferably of Na-CMC granules, or/and of starch phosphate granules is strewed onto the web, and a second wet paper web produced on a paper machine is placed onto that layer of granules and couched with the paper web coated with the granules, and then dried as a multilayer paper.

The base of the paper of the invention is composed of firm paper, particularly of sulfate paper. If the layer of cellulose ether granules or of phosphate starch granules is an intermediate layer of the paper according to the invention, the cover sheet also is composed of firm paper. The base sheet or the base sheet and the cover sheet preferably are composed of a so-called cable paper.

The layer of granules forming an outer or an intermediate layer of the paper of the invention is composed of granules of cellulose ethers, particularly of Na-CMC, or of phosphate starch or of a mixture of granulated cellulose ether and phosphate starch. The particle size of the granulates is substantially in the range from 0.05 to 1.0 mm, preferably from 0.3 to 0.8 mm. Sodium carboxymethyl cellulose is used in the form of a loose powder with a bulk weight of 400 to 600 g per liter. The surface of the granules is open, i.e. not glassy or horny, but flaky. It is also possible to use sodium carboxymethyl cellulose with a higher or lower salt content; but the content of pure sodium carboxymethyl cellulose in the granules preferably should be at least 65 percent by weight.

The phosphate starch granules are composed of phosphate starch which swell considerably in water but form no sol with cold water in the usual concentration (e.g. 2 percent by weight). Their grain size is in the range of 0.05 to 0.2 mm, preferably from 0.05 to 0.1 mm. In cold water, the starch phosphate granules swell while maintaining their structure to at least 10 times their volume. The production of such phosphate starch granules is described in German Offenlegungsschrift No. 2,152,576, for example. The quantity of the layer of granules is in the range of about 60 to 100 g per $m^2$ in the case of outer layers and in the range of about 50 to 100 g per $m^2$ in the case of intermediate layers. It is particularly advantageous to use a mixture of sodium carboxymethyl cellulose and phosphate starch granules in a weight ratio of about 1:1. The first-mentioned granules very rapidly absorb penetrating water and the last-mentioned granules, due to their high swellability, ensure a tight seal against further penetration of the water.

It is also highly advantageous to use granules of cross-linked cellulose ethers which are inherently soluble in water and are insoluble therein due to cross-linkage but remain water-absorbent. The granular layers may entirely or partially be composed of such cross-linked cellulose ethers. Their production is described in German Offenlegungsschrift No. 1,912,740, for example.

The strewn layer of granules should have a unit weight of at least 10 g per $m^2$ for achieving a useful water absorption. Generally, the thickness of the layers of granules corresponds to a weight between 10 and 50 g per $m^2$.

For the aqueous solution which is applied to the paper base according to the first-mentioned process of the invention, there is preferably used a highly viscous cellulose ether, particularly a Na-CMC which, as a 2 percent aqueous solution, has a viscosity of 5,000 to 10,000 cp at 20° C., measured in a viscosimeter according to Höppler. The quantity of the coating must be sufficient for adhering the subsequently strewn on granules to the base. The concentration of the coating solution depends upon the viscosity behavior required for the coating device employed. The coating may be applied, for example, by means of an air-brush or by means of a roller. In most cases, it is advantageous, after the layer of granules has been strewn on, to apply once more an aqueous solution of sodium carboxymethyl cellulose. For this second coating, there may be used a highly viscous or a medium-viscous type (viscosity of the 2 percent solution at 20° C. at least 200 cp) of sodium carboxymethyl cellulose.

Almost always it is not necessary to apply a solution of sodium carboxymethyl cellulose after the granular layer has been strewn on if the coating applied prior to the deposition of the granular layer, in addition to the sodium carboxymethyl cellulose, contains 0.1 to 20 percent by weight, calculated thereon, of a water-soluble wax. Suitable waxes are particularly polyglycol waxes. Since these waxes are more readily soluble in water at a slightly elevated temperature, the wax-containing coating solutions are advantageously used at temperatures of about 60° C.

After the granular layer has been applied or, if a second coating of a sodium carboxymethyl cellulose is applied, after the second coating, the coated paper is dried. Drying is performed under such conditions that the sodium carboxymethyl cellulose or the phosphate starch granules do not become horny.

According to the second mentioned process of the invention, the granules strewn on the base are covered with a second paper web. Adherence of the granules with a sodium carboxymethyl cellulose solution or another binder is not necessary. Cohesion of the base and the cover sheet with the layer of granules is achieved by couching. Strewing of the granules, covering of the granules with a cover sheet and couching may be repeated once or several times, the previously used cover sheet serving as the base for the next strewing procedure. Each of the formed intermediate layers of granules advantageously has a surface weight of 50 to 100 g per m$^2$.

The paper of the invention has the advantage that it is a very efficient sealing means which can be applied to cable cores by means of the usual serving or spinning processes. The processes according to the invention have the advantage that they can be performed with aggregates available in paper manufacturing plants.

It will be obvious to those skilled in the art that many modifications may be made within the scope of the present invention without departing from the spirit thereof, and the invention includes all such modifications.

What is claimed is:

1. A paper for serving cable cores for the purpose of providing a swellable layer, comprising a paper base having a layer thereon of granules of a cross-linked cellulose ether which is inherently soluble in water, but is insoluble therein due to cross-linking, and which remains water-absorbent.

* * * * *